US009187044B2

(12) United States Patent
Bonner et al.

(10) Patent No.: US 9,187,044 B2
(45) Date of Patent: Nov. 17, 2015

(54) MULTI-FUNCTIONAL CARGO MANAGEMENT SYSTEM FOR A VEHICLE

(75) Inventors: Jeffrey A. Bonner, Harrison Township, MI (US); Brent T. Deep, Milford, MI (US); Scott D. Tonks, Clarkston, MI (US); Sherry L. Quijano, Grand Blanc, MI (US); Anthony E. Johnson, Canton, MI (US); Christopher D. Rauser, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 13/558,663

(22) Filed: Jul. 26, 2012

(65) Prior Publication Data
US 2014/0027483 A1    Jan. 30, 2014

(51) Int. Cl.
*B60R 9/00* (2006.01)
*B60P 7/14* (2006.01)
*B60P 7/15* (2006.01)

(52) U.S. Cl.
CPC ... *B60R 9/00* (2013.01); *B60P 7/14* (2013.01); *B60P 7/15* (2013.01)

(58) Field of Classification Search
CPC ..... B60R 9/00; B60R 9/052; B60P 7/14–7/15
USPC ........... 224/403, 405; 410/143–152; 296/39.2
See application file for complete search history.

(56) References Cited

U.S. PATENT DOCUMENTS

| 2,608,420 | A | * | 8/1952 | Eck ............................... 410/149 |
| 4,211,448 | A | * | 7/1980 | Weston ............................ 296/3 |
| 4,772,165 | A | * | 9/1988 | Bartkus ......................... 410/139 |
| 4,938,403 | A | * | 7/1990 | Cortelli ......................... 224/310 |
| 5,104,269 | A | * | 4/1992 | Hardison ....................... 410/149 |
| 5,411,355 | A | * | 5/1995 | Gosnell et al. ................ 410/139 |
| 5,435,616 | A | * | 7/1995 | Corner ....................... 296/180.1 |
| 5,688,087 | A | * | 11/1997 | Stapleton et al. ............. 410/150 |
| 5,769,293 | A | * | 6/1998 | Zaretsky ........................ 224/551 |
| 6,077,007 | A | * | 6/2000 | Porter et al. .................. 410/140 |
| 6,179,181 | B1 | * | 1/2001 | Johnson et al. ............... 224/405 |
| 6,543,975 | B2 | * | 4/2003 | Kopperud ..................... 410/118 |
| 6,629,807 | B2 | * | 10/2003 | Bernardo ...................... 410/132 |
| 6,827,533 | B2 | * | 12/2004 | Cano-Rodriguez et al. .. 410/128 |
| 7,464,977 | B1 | * | 12/2008 | Price ................................. 296/3 |
| 7,819,295 | B2 | * | 10/2010 | Plavetich ...................... 224/403 |
| 8,550,757 | B2 | * | 10/2013 | Anderson et al. ............. 410/104 |

* cited by examiner

*Primary Examiner* — Justin Larson
*Assistant Examiner* — Phillip Schmidt
(74) *Attorney, Agent, or Firm* — Quinn Law Group, PLLC (57) ABSTRACT

A cargo management system for a vehicle includes a beam assembly that has a first end and a second end. At least one of the ends is biased axially outward and compressible axially inward. Each of the ends has a common interface configured to be supportable by the opposing side walls of the vehicle so that the beam assembly is supported at both of the first and second ends by the walls and extends over a floor of a vehicle, with said at least one of the ends compressed axially inward. The beam assembly can be used as a bed divider, to provide two-tier loading, and as a ladder rack.

18 Claims, 4 Drawing Sheets

MULTI-FUNCTIONAL CARGO MANAGEMENT SYSTEM FOR A VEHICLE

TECHNICAL FIELD

The present teachings generally include a cargo management system for a vehicle.

BACKGROUND

Pick-ups and utility vehicles are often provided with a bed or cargo bay for transporting cargo. A variety of items are available for utilizing the cargo space. For example, bed dividers can be purchased as an after-market item. Horizontal dividers can also be installed to enable tiered storage. Ladder racks are also commercially available. While useful, these items are often expensive. Moreover, each of these must be purchased as separate items. When not in use, these items must generally be removed from the vehicle and stored off-board. Storing a bed divider, a tiered storage divider, and a ladder rack requires a significant amount of storage space.

SUMMARY

A cargo management system includes a beam assembly that can be installed in a vehicle bed in various positions to provide multiple functions. For example, the beam assembly may be used as a bed divider. If two beam assemblies are used, they may be configured to enable two-tier cargo loading in the bed, or, in another position, function as a ladder rack.

More specifically, a cargo management system for a vehicle includes a beam assembly that has at least one end biased axially outward and compressible axially inward. Both ends of the beam assembly have a common interface that is configured to be supported at opposing side walls of the vehicle bed so that the beam assembly is supported at both of the ends by the side walls over the floor.

The beam assembly may include a substantially hollow rail, at least one end portion supported within the rail, and a biasing device biasing the end portion axially outward from the rail. The rail and the end portion have openings configured to be aligned when the end portion is compressed axially inward against the biasing device. A locking pin is configured to extend through the aligned openings of the rail and the end portion to prevent axial movement of the end portion relative to the rail when the beam assembly is installed, effectively locking the beam assembly in place on the vehicle. Two beam assemblies may be spaced from one another in the vehicle bed to provide support for cargo, enabling two-tier loading.

When the cargo management system is used as a bed divider, the cargo management system includes a pair of leg supports each having a distal portion that is configured to fit around the beam assembly and an elongated foot configured to rest against the floor and extend longitudinally when the distal portion is slid over the beam assembly. The beam assembly is attached at the side walls to extend across the bed, with the elongated foot preventing the leg from pivoting about the distal end. A net is configured to be securable to the beam assembly and the leg supports.

To enable the cargo management system to be used as a ladder rack, a pair of stanchions is configured to fit into the openings of the respective side walls so that the stanchions are supported by and extend above the side walls. Each of the stanchions has a support feature configured to receive either one of the ends of the beam assembly to thereby support the beam assembly above the vehicle bed with the beam assembly extending over the vehicle bed.

The cargo management system can be secured to the vehicle and stored onboard when not in use. A support member has one end configured to fit to one of the side walls so that the support member is mounted to the side wall and extends substantially laterally therefrom. The support member is configured to hold a side of the beam assembly. The beam assembly is thereby supported by the side wall and by the support member so that the beam assembly extends substantially parallel to the side walls in a stored position.

The above features and advantages and other features and advantages of the present teachings are readily apparent from the following detailed description of the best modes for carrying out the present teachings when taken in connection with the accompanying drawings.

DETAILED DESCRIPTION

Figure 1:
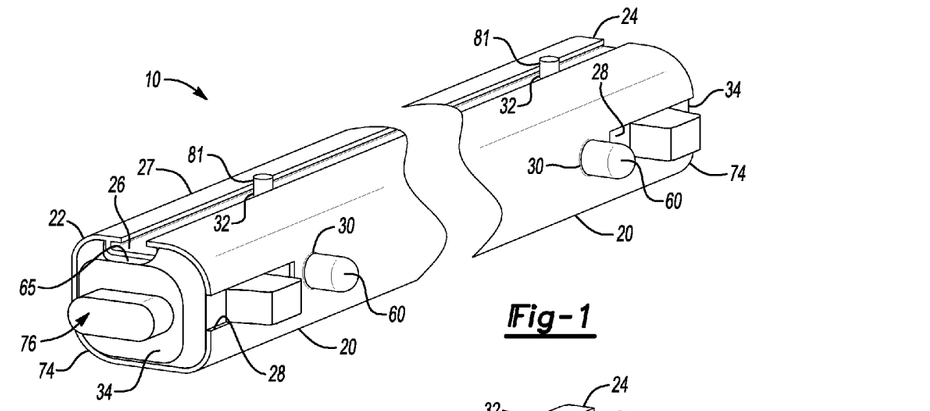
FIG. 1 is a schematic perspective fragmentary illustration of a beam assembly including a rail and a biased end portion in accordance with one aspect of the present teachings.
Figure 4:
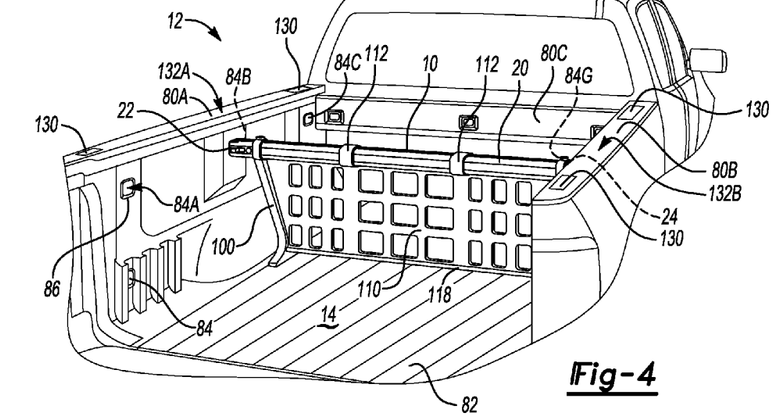
FIG. 4 is a schematic perspective illustration of a vehicle in fragmentary view with the beam assembly attached to side walls and with a net and leg portions to function as a bed divider.
Figure 10:
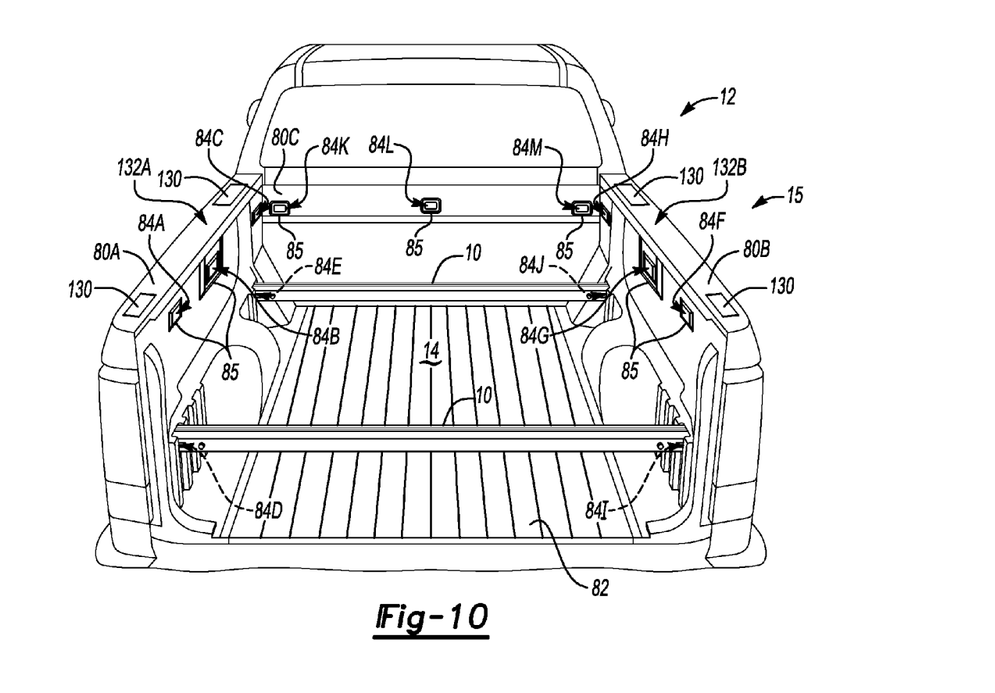
FIG. 10 is a schematic perspective illustration of the vehicle of FIG. 4 in fragmentary view, with two rail assemblies secured to the side walls at attachment features to provide multi-tier loading.

Referring to the drawings, wherein like reference numbers refer to like components throughout the several views, FIG. 1 shows a beam assembly 10 in exploded view. As shown in FIG. 4, the beam assembly 10 is used in a vehicle 12 with a cargo bed 14 for multiple functions as part of a cargo management system 15 as explained herein. For example, the beam assembly 10 can be used as a bed divider, as shown in FIG. 4, with a second beam assembly 10 to enable two-tiered loading of cargo as shown in FIG. 10, with stanchions 16 in FIG. 12 to function as a ladder rack, or with support members 140 as shown in FIG. 13 to be stored onboard the vehicle 12 in a stowed position when not in use.

Figure 2:
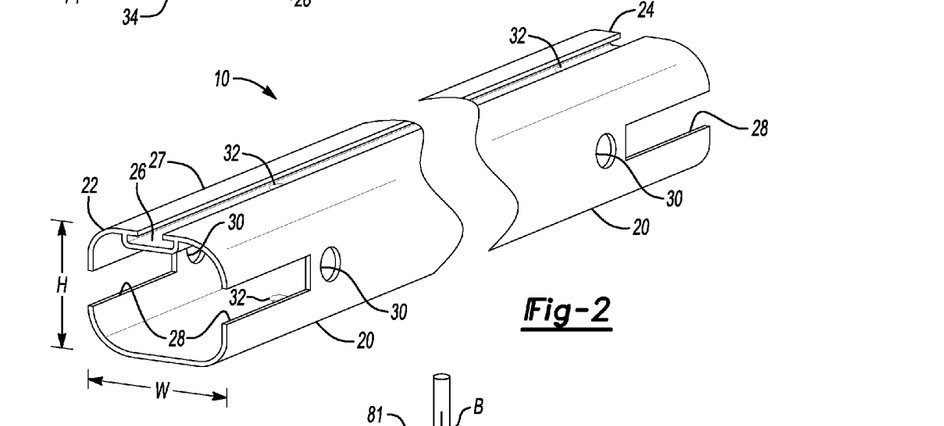
FIG. 2 is a schematic perspective fragmentary illustration of a rail of the beam assembly of FIG. 1.

The beam assembly 10 includes a hollow, extruded rail 20, as shown in FIG. 2, that can be an aluminum alloy, steel, plastic, or other suitable material. The rail 20 can also be referred to as a beam. The rail 20 has a first end 22 with an elongated substantially rectangular opening having rounded corners. The first end 22 has a width W that is greater than its height H, forming a rectangle. The rectangular shape of the first end 22 prevents rotation of the rail 20 about its longitudinal axis when it is attached to the vehicle 12 as further explained herein. The rail 20 has a second end 24 with an identical elongated, substantially rectangular opening with rounded corners.

The rail 20 has a T-shaped slot 26 along an upper side 27 running from the first end 22 to the second end 24. The slot 26 can receive and retain T-shaped attachments, such as may be connected to cargo bags, sports equipment such as Kayaks, containers, or other cargo. Although the slot 26 is T-shaped, it may instead be of another shape configured to be complementary to commercially available cargo connectors.

Each of the ends 22, 24 has a pair of slots 28 extending lengthwise partway along the rail 20, and a pair of openings 30 adjacent the slots 28. One of the slots 28 and openings 30 is obscured at the end 24 in FIG. 2, but it is symmetrical with the slot 28 and opening 30 shown. Another opening 32 is formed near each end 22, 24 at the upper side 27 of the rail 20 generally aligned with the openings 30.

Figure 3:
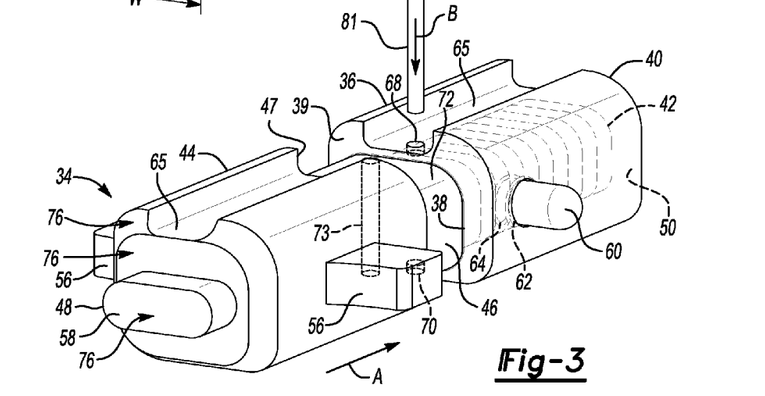
FIG. 3 is a schematic perspective illustration of the biased end portion of the beam assembly of FIG. 1 including a locking pin.

FIG. 3 shows an end portion 34 of the beam assembly 10. There is a separate end portion 34 inserted at each end 22, 24 of the beam assembly 10 as shown in FIG. 1. Alternatively, the beam assembly 10 could have an end portion 34 inserted at only one of the ends 22, 24, and the other end 22 or 24 could have an insert with the same interface as the end portion 34, but configured to be fixed axially within the rail 20 rather than compressible axially inward. The end portion 34 includes a base 36 with a cavity 38 extending only partially therethrough from a first end 39 but not completely to a second end 40. A biasing element, which in this embodiment is a coil spring 42, is nested in the cavity 38 and is shown with hidden lines in FIG. 3.

The end portion 34 also includes a slidable portion 44 with a neck 46 extending from one end 47. The neck 46 is sized to fit within the cavity 38 at the first end 39 of the base 36. The slidable portion 44 is biased axially outward (i.e., away from the base 36) by the spring 42, but is compressible axially inward toward the base 36 when a force is applied to an end 48 of the slidable portion 44, causing the neck 46 to slide into the cavity 38 and compress the spring 42 between the slidable portion 44 and a terminal wall 50 within the base 36 at which the cavity 38 ends.

The slidable portion 44 has arms 56 that extend from opposite sides of the slidable portion 44. An extension 58 is centered at the end 48 of the slidable portion 44. The base 36 has spring-loaded buttons 60, also referred to as pegs, that extend from either side of the base 36. Only one button 60 is visible in FIG. 3, but another identical spring-loaded button 60 extends from the opposite side of the base 36. Each button 60 extends through an opening 62 in the base 36 and is biased outward by a compression spring 64 retained between an inner wall of the base 36 and a back surface of the button 60 facing the inner wall. Both the base 36 and the slidable portion 44 have a centered recess 65 along an upper side.

As can be seen in FIG. 1, each of the end portions 34 is configured to fit within the hollow rail 20 with the base 36 furthest inward, and the centered recess 65 aligned with T-shaped slot 26. When the end portions 34 are installed into the rail 20, the buttons 60 compress to slide past the wall of the rail 20 into the openings 30, at which point the force of the rail 20 on the buttons 60 is released, and the buttons 60 expand outward through the openings 30 to retain the base 36 at a fixed axial position within the rail 20. The arms 56 of the slidable portion 44 fit within the slots 28 and allow the slidable portion 44 to be compressed axially inward toward the fixed base 36 until the arms 56 contact the ends of the slots 28, or until the end 47 of the slidable portion 44 contacts the end 39 of the base 36.

The base 36 has aligned openings 68, 70 in both the upper and lower sides of the base 36. The openings 68, 70 extend through to the cavity 38. The neck 46 of the slidable portion 44 has a cylindrical opening 73 extending completely therethrough. Additionally, the rail 20 has aligned openings 32 at both an upper and lower wall of the rail 20 near both ends 22, 24. When the end portion 34 is inserted into the hollow rail 20 as shown in FIG. 1, and a compressive force is applied to the end 48 of the slidable portion 44 in the direction of arrow A to compress the slidable portion 44 axially inward toward the base 36, the cylindrical opening 73 will align with the openings 68, 70 in the base 36, and also with the openings 32 in the rail 20. This allows a locking pin 81 to be inserted in the direction of arrow B through the aligned openings 32, 68, 70, 73, preventing any relative axial movement of the slidable portion 44, the base 36, and the rail 20. Thus, when the beam assembly 10 is installed in the various positions in the vehicle 12 as described herein, it can be locked securely in place with the locking pin 81. Optionally, the locking pin 81 may have a keyed tumbler or other locking mechanism to prevent removal of the locking pin 81 without a key or code so that the beam assembly 10 can be locked in place on the vehicle 12.

Each end 22, 24 of the rail 20 has an identically-shaped perimeter 74. The perimeter 74 of the end 22 or 24 of the rail 20 and the surface 76 of the end 48 of the slidable portion 44 define an interface 74, 76. The surface 76 includes the outer surface of the extension 58 and the remainder of the surface of the slidable portion 44 that are exposed axially outward, as shown in FIG. 3. The beam assembly 10 thus has a common interface 74, 76 at each end 22, 24 of the rail 20. The interface 74, 76 of each end 22, 24 is "common" if it is substantially similar enough to the attachment features 84A-84M (described herein) on the vehicle 12 so that either end 22, 24 can fit into an attachment interface 84A-84M on the vehicle.

FIGS. 4, 10 and 13 show that the vehicle bed 14 is defined by the vehicle body, including side walls 80A, 80B, a front wall 80C, and a floor 82. The walls 80A, 80B, 80C can include structural panels as well as trim panels. The walls 80A, 80B, and 80C have multiple openings 85 at which plugs 86 (shown in FIGS. 8 and 9, one of which is indicated by reference number in FIG. 9) are installed to provide multiple identical attachment features 84A-84M which have interfaces each of which is complementary with and can receive the common interface 74, 76 of the beam assembly 10 at either end of the rail 20. Specifically, the side wall 80A includes attachment features 84A, 84B, 84C (partially visible in FIG. 10) and attachment features 84D, 84E (visible in FIG. 13). The side wall 80B includes attachment features 84F, 84G, 84H (visible in FIG. 10) and attachment features 84I, 84J (visible in FIG. 13). As can be seen in FIGS. 10 and 13, the attachment features of the respective side walls 80A, 80B are laterally aligned with one another in pairs 84A, 84F; 84B, 84G; 84C, 84H; 84D, 84I; and 84E, 84J, along the length of the bed 14.

Figures 8, 9:
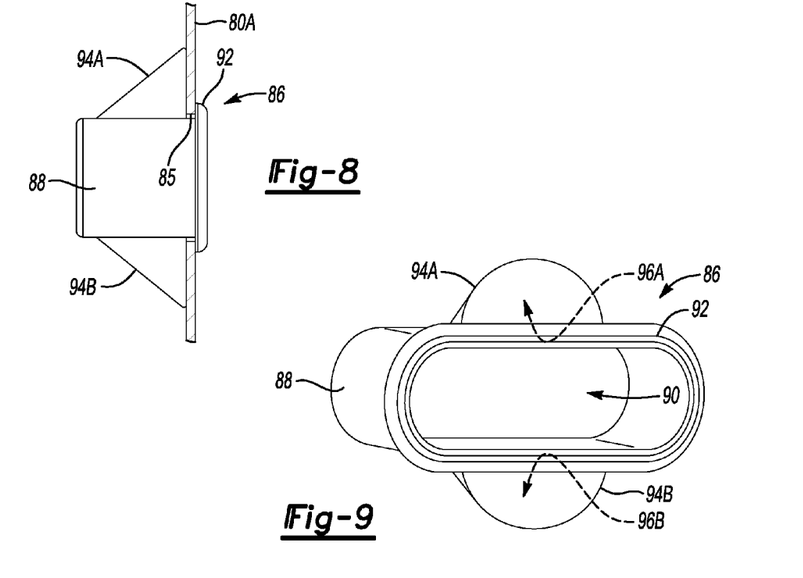
FIG. 8 is a schematic side view illustration of an attachment feature configured to secure to any of the walls of the vehicle for receiving to the beam assembly, with the side wall shown in fragmentary cross-section.
FIG. 9 is a schematic perspective illustration of the attachment feature of FIG. 8.

The front wall 80C includes attachment features 84K, 84L and 84M. Each of the attachment features 84A-84M is a plug 86 (as shown in FIGS. 8 and 9) and a respective opening in the wall 80A, 80B, or 80C at which the plug 86 is installed. The wall 80A, 80B or 80C around each opening 85 and plug 86 is configured to retain either end 22 or 24 of the rail 20 of the beam assembly 10.

FIGS. 8 and 9 show the plug 86 in greater detail. In FIG. 8, the plug 86 is installed in an opening 85 of the wall 80A, shown in cross-section. The plug 86 has a rectangular body with rounded edges that defines a cavity configured to receive the end 22 or 24. That is, the rectangular shape of the cavity 90 and the body 88 is substantially the same as the rectangular shape of the end 22 or 24. The perimeter 74 of the end 22 or 24 fits within the cavity 90. The rectangular shape prevents turning of the rail 20 when the beam assembly 10 is installed on the vehicle 12. A rim 92 of the plug 86 around the body 88 surrounds the opening 85 in the wall 80A, 80B or 80C. The plug 86 has flanges 94A and 94B that extend from the body 88 and have hollow interiors 96A, 96B that open to the cavity 90. The plug 86 is a flexible material, and can therefore be installed at the opening 85 with the flanges 94A, 94B extending on the opposite side of the wall 80A than the vehicle bed 14. That is, the flanges 94A, 94B are within an inner cavity of the wall 80A and are not visible from the vehicle bed 14. The flanges 94A, 94B are sized so that standard vehicle cargo hooks can be inserted at any of the plugs 86 to which the beam assembly 10 is not currently installed. For example, a cargo hook could be attached at the plug 86 of the attachment interface 84A in FIG. 4 because the beam assembly 10 is not attached at the attachment interface 84A. The hooks are turned once inserted, so that portions of the hook extend into the interiors 96A, 96B of the plug and are secured to the wall 80A, 80B or 80C at the plug 86.

FIG. 4 shows one beam assembly 10 installed on the vehicle 12 to function as a bed divider. The beam assembly 10 is installed with end 22 at attachment interface 84B and end 24 at attachment interface 84G, which is laterally aligned with attachment interface 84B, as shown in FIG. 10. When installed between the walls 80A, 80B the end portion 34 shown in FIG. 1 is biased axially inward. The rail 20 has an overall length sized to fit in the space between the walls 80A, 80B sufficiently to span the bed 14 with the ends 22, 24 securely positioned at the attachment features 84B, 84G.

Figure 5:
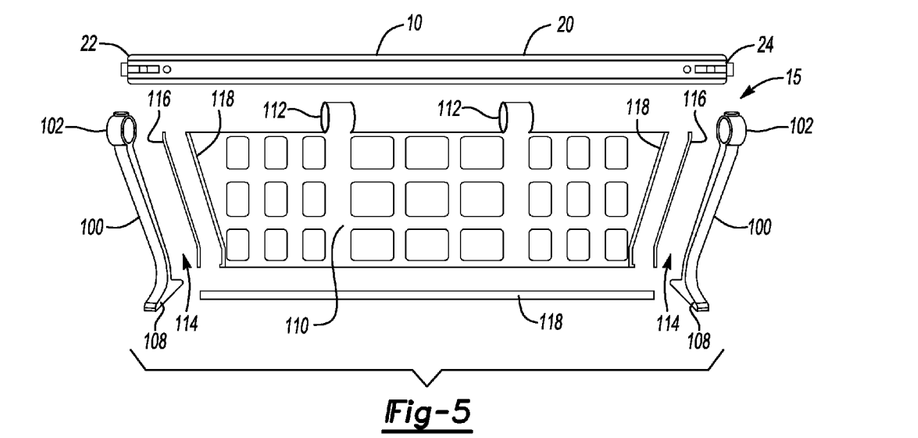
FIG. 5 is a schematic exploded view of the beam assembly, net, and leg portions of FIG. 4.
Figure 6:
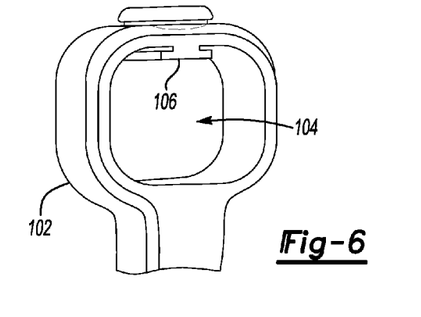
FIG. 6 is a schematic perspective illustration in fragmentary view of an end portion of one of the leg portions of FIGS. 4 and 5 configured to attach to the rail of the beam assembly.

As shown in FIGS. 4 and 5, when the beam assembly 10 is used as a divider, the cargo management system 15 includes a pair of leg supports 100 each having a distal portion 102 that is configured to fit around the beam assembly 10. As best shown in FIG. 6, the distal portion 102 has an opening 104 that is substantially rectangular with rounded corners, serving as a ringed end portion, so that it will snugly slide around and fit over the outer perimeter of the rail 20. The distal portion 102 also forms a T-shaped insert 106 that can slide into the T-shaped slot 26 of the rail 20. Each leg support 100 has an elongated foot 108, shown in FIG. 5.

The cargo management system 15 also includes a net 110 with attachment loops 112 that are sized to slide over the rail 20, as shown in FIG. 4. The net 110 can be a fabric, plastic, or other suitable material. Attachment mechanisms 114 are used to secure sides of the net 110 to the leg supports 100. In this embodiment, the attachment mechanisms 114 are strips of hook and loop fasteners, such as VELCRO®. A strip 116 of the hooks can be secured to the leg support 100, and a strip 118 of the loops secured to the net 110, allowing the net 110 to be secured to the leg supports 100 by attaching the hooks with the loops. In other embodiments, hooks or ties can alternatively be used to secure the net 110 to the leg supports 100.

Figure 7:
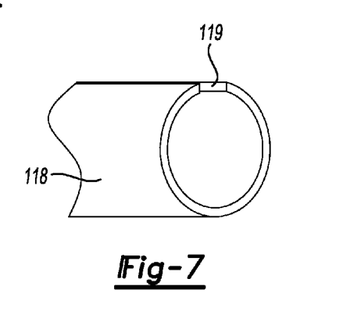
FIG. 7 is a schematic perspective illustration of a lower rail attached to the net of FIGS. 4 and 5.

As shown in FIGS. 5 and 7, a weighted bar 118 has a slot 119 along its length. The bar 118 is configured to be secured to an edge of the net 110 by slipping the edge of the net 110 through the slot 119 and sliding the bar 118 along the net 110 until the bar 118 extends along a lower portion of the net 110 as shown in FIG. 4. The lower edge of the net 110 can be hemmed or thickened so that the bar 118 is connected with and extends from the net 110.

When the leg support 100 and loops of the net 110 are slid over the rail 20 and the beam assembly 10 is attached at the attachment interfaces 84B, 84G, the leg supports 100 will rest on the floor 82 and the net 110 will extend transversely across the bed 14. The elongated foot 108 extends lengthwise in the bed 14 in this position. The elongated foot 108 can thus prevent the leg support 100 from pivoting about the distal end 102 secured to the rail 22. The elongated feet 108 of the leg supports 100 will thus inhibit a force applied to the net 110 or to the leg supports 100 by cargo in the bed 14 from off-setting the leg supports 100.

Although only one beam assembly 10, one pair of leg supports 100 and one net 110 are shown attached to the vehicle 12 in FIG. 4, if desired, two additional beam assemblies 10 with nets 110 and leg supports 100 can be secured to the vehicle 12 to extend between the attachment features 84A, 84F and 84C, 84H, respectively.

As shown in FIG. 10, the cargo management system 15 can also be configured to provide multi-tiered loading. Two beam assemblies 10 are used, and are attached to the side walls 80A, 80B at the attachment interfaces 84D, 84I and 84E, 84J, respectively. Because the attachment interfaces 84D, 84E are spaced from one another substantially the same spacing as attachment interfaces 84I, 84J, and are all approximately the same distance above the floor 82, the beam assemblies 10 are substantially parallel and level above the floor 82. Relatively long cargo, such as plywood boards, can rest on the beam assemblies 10 at a height above the floor 82, and additional cargo, such as more plywood sheets or smaller items, can be stored on the floor below the beam assemblies 10. The beam assemblies 10 thus providing an additional tier above the floor 82 to enable two-tier loading.

Figure 11:
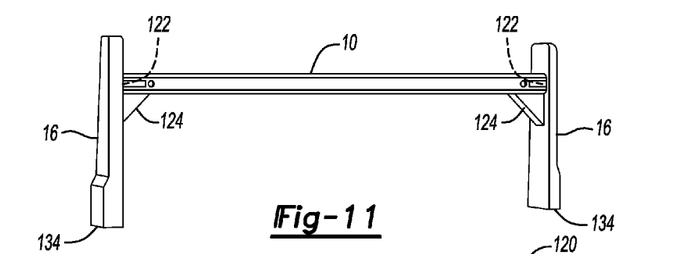
FIG. 11 is a schematic perspective illustration of the beam assembly of FIG. 1 supported by a pair of stanchions.
Figure 12:
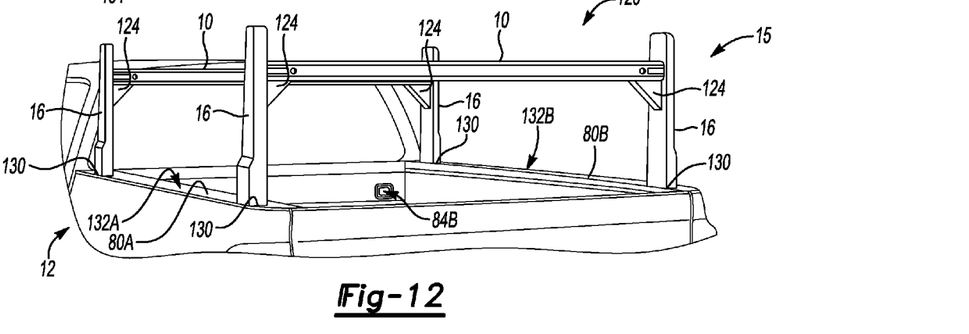
FIG. 12 is a schematic perspective illustration of the vehicle of FIGS. 4 and 10 with two beam assemblies supported by four stanchions secured at openings in the side walls to function as a ladder rack.
Figure 13:
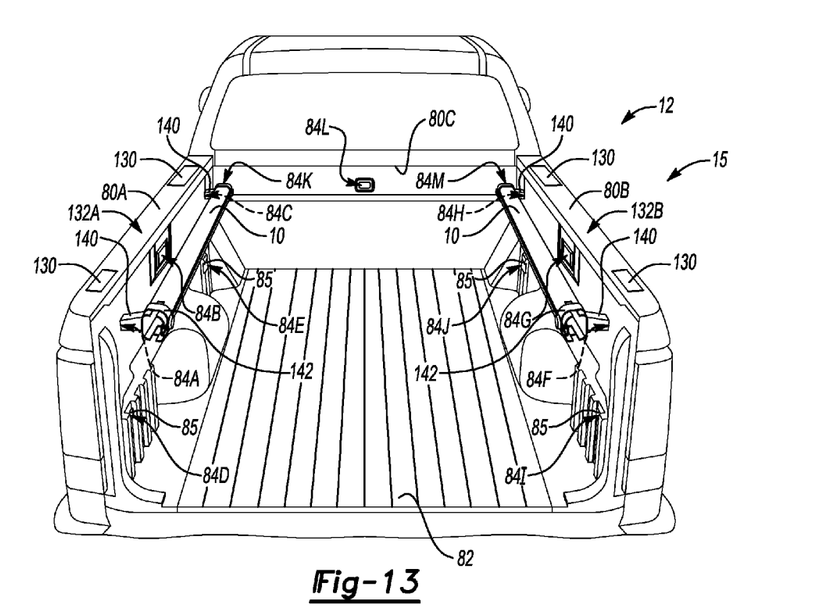
FIG. 13 is a schematic perspective illustration of the vehicle of FIGS. 4, 10, and 12, with two beam assemblies secured by supports that extend from the attachment features in the side walls so that the beam assemblies extend parallel to the side walls in a stowed position.

FIGS. 11 and 12 illustrate the ability of the beam assembly to be used in a ladder rack 120. Two stanchions 16 are used with each beam assembly 10. Each stanchion 16 has an opening 122 that extends partway through the stanchion 16. The opening 122 has a perimeter substantially the same as the perimeter 74 of the end portion 22 or 24 so that the rail 20 with the end portion 34 installed therein can be inserted into the opening 122 of the stanchion 16. A ledge 124 extends from the stanchion 16 below the opening 122 to support the rail 22 when the beam assembly 10 is installed in the openings 122 of the stanchions 16.

Each of the side walls 80A, 80B has two spaced openings 130 in respective upper surfaces 132A, 132B of the side walls 80A, 80B, as shown in FIGS. 4, 10 and 13. Each opening 130 is sized to receive a base 134 of the stanchion 16 so that four stanchions 16 can be secured in upright positions extending from the side walls 80A, 80B with beam assemblies 10 spanning over the bed 14 between the side walls 80A, 80B. One or more ladders can be laid across the beam assemblies 10 with connectors that fit into the T-shaped slots 26 of the beam assemblies 10 to secure the ladders to the beam assemblies 10. Ropes or bungee cords can be used alternately or in addition to such connectors to secure a ladder to the beam assemblies 10.

When the beam assemblies 10 are not needed for functioning as a bed divider, for two-tier loading, or as part of a ladder rack 120 as described herein, the beam assemblies 10 can be stored lengthwise, parallel to the side walls 80A, 80B. A support member 140 is provided that has one end configured to fit to the attachment interface 74, 76 of any one of the attachment features 84A, 84C, 84F, 84H in the side walls 80A. 80B so that the support member 140 is mounted to the side wall 80A, 80B. In FIG. 13, Support members 140 fit at attachment features 84A, 84C, 84F and 84H. Two support members 140 are used with each beam assembly 10. The support members 140 extend substantially laterally from the side walls 80A, 80B. Each support member 140 has a distal end 142 with a ringed end-portion, substantially similar to distal end 102 of the leg support 100, so that the distal end 142 can slide over and fit around the rail 20 to hold a side of the beam assembly 10. One end of each beam assembly 10 can be installed at the attachment interfaces 84K, 84M of front wall 80C in this position, to further secure the beam assemblies 10 to the vehicle 10. The beam assemblies 10 are thus supported at the attachment features 84K, 84M of the front wall 80C and by the support members 140 mounted at the attachment features 84A, 84C, 84F, 84H of the side walls 80A, 80B so that the beam assemblies 10 extend parallel to and are relatively close to the side walls, 80A, 80B, leaving much of the bed 14 open when the beam assemblies 10 are in the stowed positions of FIG. 13.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A cargo management system for a vehicle having a vehicle bed at least partially defined by opposing side walls and a floor, the cargo management system comprising:
 a beam assembly having a first end and a second end, at least one of the ends biased axially outward and compressible axially inward, each of the ends having a common interface configured to be supportable by the opposing side walls so that the beam assembly extends over the floor;
 wherein the beam assembly includes a substantially hollow rail and an end portion supported within the rail;
 wherein the end portion includes a base with a cavity extending partway through the base; wherein the biasing element is nested in the cavity; wherein the end portion further includes a slidable portion with a neck; wherein the neck is sized to fit within the cavity;
 wherein the beam assembly further includes a biasing device biasing the slidable portion axially outward from the rail;
 wherein the rail, the base and the slidable portion have openings configured to be aligned when the slidable portion is compressed axially inward against the biasing device; and
 a locking pin configured to extend through the aligned openings of the rail, the base and the slidable portion, the locking pin thereby preventing axial movement of the slidable portion and the base relative to the rail.

2. The cargo management system of claim 1, wherein the side walls have upper surfaces with openings, and further comprising:
 a pair of stanchions configured to fit into the openings of the respective side walls so that the stanchions are supported by and extend above the side walls; wherein each of the stanchions has a support feature configured to receive either one of the ends of the beam assembly to thereby support the beam assembly above the vehicle bed with the beam assembly extending over the vehicle bed.

3. The cargo management system of claim 1, wherein the vehicle has a front wall extending between the side walls, and further comprising:
 a pair of support members each having one end configured to fit to one of the side walls so that the support members are mounted to said one of the side walls and extend substantially laterally therefrom; wherein the support members are configured to hold a side of the beam assembly, the beam assembly thereby being supportable by said one of the side walls and by the support member so that the beam assembly extends substantially parallel to the side walls.

4. The cargo management system of claim 1, further comprising:
 a pair of leg supports each having a distal portion configured to fit around the beam assembly and an elongated foot configured to rest against the floor and extend longitudinally when the distal portion is fit over the beam assembly and the beam assembly is attached at the side walls to extend across the bed, the elongated foot preventing the leg support from pivoting about the beam assembly.

5. The cargo management system of claim 4, further comprising:
 a net configured to be securable to the beam assembly and the leg supports.

6. The cargo management system of claim 4, wherein the beam assembly has a slot; and wherein the distal portion of each of the leg supports has an insert configured to fit within the slot and be retained by the beam assembly within the slot.

7. The cargo management system of claim 6, wherein the slot is a T-shaped cavity and the insert is T-shaped.

8. The cargo management system of claim 1, wherein the rail has a slot; and wherein both the base and the slidable portion have a centered recess aligned with the slot when the end portion is supported within the rail.

9. The cargo management system of claim 1, wherein the rail has a pair of slots on opposite sides of the rail, and a pair of additional openings adjacent the pair of slots;
 wherein the base includes spring-loaded buttons extending from opposite sides of the base; wherein the spring-loaded buttons are configured to compress to slide past the rail and release into the additional openings to retain the base at a fixed axial position within the rail.

10. A vehicle comprising:
 a vehicle body having walls and a floor that partially define a vehicle bed;
 a beam assembly having a first end and a second end, at least one of the ends biased axially outward and compressible axially inward, each of the ends having a common interface;
 wherein each of the walls has at least one attachment feature configured with a complementary attachment interface to receive the common interface of either one of the first and second ends so that the beam assembly is supported at both of the first and second ends by the walls over the floor;
 wherein the beam assembly includes a substantially hollow rail, an end portion supported within the rail, and a biasing device; wherein the end portion includes a base with a cavity extending partway through the base; wherein the biasing element is nested within the cavity; wherein the end portion further includes a slidable portion with a neck; wherein the neck is sized to fit within the cavity; wherein the biasing element biases the slidable portion axially outward from the rail;
wherein the rail, the base, and the slidable portion have openings configured to be aligned when the slidable portion is compressed axially inward against the biasing device when the beam assembly is supported at the attachment features of the side walls across the bed;
a locking pin configured to extend through the aligned openings of the rail, the base, and the slidable portion, the locking pin thereby preventing axial movement of the slidable portion and the base relative to the rail;
wherein the rail has a pair of slots on opposite sides of the rail, and a pair of additional openings adjacent the pair of slots;
wherein the base includes spring-loaded buttons extending from opposite sides of the base; and wherein the spring-loaded buttons are configured to compress to slide past the rail and release into the additional openings to retain the base at a fixed axial position within the rail.

11. The vehicle of claim 10, wherein the walls include a pair of opposing side walls each having multiple ones of said attachment features spaced so that the attachment features of the opposing side walls are laterally aligned with one another in pairs along a length of the bed, thereby allowing the beam assembly to be selectively supported by the side walls at different positions along a length of the bed.

12. The vehicle of claim 11, wherein the walls include a front wall extending between the side walls, and further comprising:
at least one additional attachment feature in the front wall;
a support member having one end configured to fit to the attachment interface of any one of the attachment features in the side walls so that the support member is mounted to one of the side walls and extends substantially laterally therefrom; wherein the support member is configured to hold a side of the beam assembly when one of the ends is received in said at least one additional attachment feature, the beam assembly thereby being supportable at said at least one additional attachment feature of the front wall and by the support member mounted at the attachment feature to one of the side walls so that the beam assembly extends substantially parallel to the side walls and is spaced above the floor.

13. The vehicle of claim 10, further comprising:
a pair of leg supports each having a distal portion configured to fit around the beam assembly and an elongated foot configured to rest against the floor and extend longitudinally when the distal portion is fit around the beam assembly and the beam assembly is attached at the attachment features in the walls to extend across the bed, the elongated foot preventing the leg support from pivoting about the beam assembly;
wherein the rail has an additional slot; and wherein the distal portion of each of the leg supports has an insert configured to fit within the additional slot and be retained by the rail within the slot.

14. The vehicle of claim 13, further comprising:
a net configured to be securable to the beam assembly and the leg supports to extend across the bed between the beam assembly and the floor.

15. The vehicle of claim 10, wherein the walls include a pair of opposing side walls; wherein each of the side walls has an upper surface with an opening, and further comprising:
a pair of stanchions configured to fit into the openings of the side walls so that the stanchions are supported by and extend above the side walls; wherein each of the stanchions has a support feature configured to receive either one of the ends of the beam assembly to thereby support the beam assembly above the vehicle bed with the beam assembly extending over the vehicle bed.

16. A cargo management system for a vehicle that has side walls, a front wall extending between the side walls, and a floor that partially define a vehicle bed, each of the side walls having openings at an upper surface thereof, the cargo management system comprising:
attachment features secured at the side walls and the front wall; wherein each of the attachment features forms a cavity;
a first and a second beam assembly each having a first end and a second end at least one of which is biased axially outward and compressible axially inward, each of the ends having a common interface configured to be insertable into the cavity to attach to any of the attachment features of the side walls so that the beam assemblies can be spaced from one another and extend between the side walls above the floor, the beam assemblies thereby functioning to provide multi-tiered loading in the bed;
wherein the first and the second beam assembly each include:
a substantially hollow rail, an end portion supported within the rail, and a biasing device;
wherein the end portion includes a base with a cavity extending partway through the base; wherein the biasing element is nested in the cavity of the base; wherein the end portion further includes a slidable portion with a neck; wherein the neck is sized to fit within the cavity of the base; wherein the biasing device biases the slidable portion axially outward from the rail;
a locking pin configured to extend through the beam assembly to prevent axial movement of the base and the slidable portion;
leg supports each having a distal end configured to fit around the beam assembly and having an elongated foot configured to rest against the floor when the leg supports are fit around the beam assembly and the beam assembly is attached at the attachment interface to the side walls;
a net configured to be securable to one of the beam assemblies when the leg supports are fit around the beam assembly, the net thereby extending across the bed between the leg supports, said one of the beam assemblies with the net and the leg supports thereby functioning as a bed divider;
stanchions configured to fit in the openings in the upper surfaces of the side walls so that the stanchions are supported by and extend above the side walls; wherein each of the stanchions is configured to receive either one of the ends of either of the beam assemblies, the stanchions thereby supporting the beam assemblies over the vehicle bed so that the beam assemblies are configured as a ladder rack; and
wherein each of the first and the second beam assemblies arc is removable from the attachment features or from the stanchions only by unlocking the locking pin.

17. The cargo management system of claim 16, further comprising:
a first and a second support member each having one end configured to fit to one of the attachment interfaces of any one of the attachment features in the side walls so that one of the support members is mounted to one of the side walls and the other of the support members is mounted to the other of the side walls, with both of the support members extending substantially laterally from the side walls over the floor;

wherein each of the support members is configured to hold a side of one of the beam assemblies so that the beam assemblies are supported by the front wall and one of the side walls and extend substantially parallel to the side walls in a stowed position.

18. The cargo management system of claim 16, wherein the rail has a pair of slots on opposite sides of the rail, and a pair of openings adjacent the pair of slots;

wherein the base includes spring-loaded buttons extending from opposite sides of the base; and wherein the spring-loaded buttons are configured to compress to slide past the rail and release into the openings to retain the base at a fixed axial position within the rail.

* * * * *